US008991694B2

(12) United States Patent
Cooke et al.

(10) Patent No.: US 8,991,694 B2
(45) Date of Patent: Mar. 31, 2015

(54) ITEM REMOVAL

(75) Inventors: Nicholas Cooke, St. Andrews (GB); Gordon Walker, Perthshire (GB)

(73) Assignee: NCR Corporation, Duluth, GA (US)

( * ) Notice: Subject to any disclaimer, the term of this patent is extended or adjusted under 35 U.S.C. 154(b) by 584 days.

(21) Appl. No.: 13/332,654

(22) Filed: Dec. 21, 2011

(65) Prior Publication Data

US 2013/0160796 A1 Jun. 27, 2013

(51) Int. Cl.

| | |
|---|---|
| ***G06Q 40/00*** | (2012.01) |
| ***B08B 1/00*** | (2006.01) |
| ***B65H 5/28*** | (2006.01) |
| ***B65H 29/54*** | (2006.01) |
| ***G07D 11/00*** | (2006.01) |
| ***G07F 19/00*** | (2006.01) |

(52) U.S. Cl.

CPC .. *B08B 1/00* (2013.01); *B65H 5/28* (2013.01); *B65H 29/54* (2013.01); *B65H 2301/4191* (2013.01); *B65H 2701/1912* (2013.01); *G07D 11/0012* (2013.01); *G07F 19/202* (2013.01)

USPC .......................................... 235/379; 235/375

(58) Field of Classification Search

CPC ........... B65H 2220/02; B65H 2513/41; B65H 2513/512; B65H 2301/4191; B65H 2557/33; B65H 2701/1912; B65H 5/28; B08B 1/00; G07D 11/0012; G07F 19/202

USPC ................................................. 235/379, 375

See application file for complete search history.

(56) References Cited

U.S. PATENT DOCUMENTS

| | | | | |
|---|---|---|---|---|
| 8,496,246 | B2 * | 7/2013 | Muranaka et al. | 271/265.02 |
| 2001/0022258 | A1 * | 9/2001 | Satou et al. | 194/206 |
| 2002/0096816 | A1 * | 7/2002 | Sasaki et al. | 271/3.14 |
| 2005/0017425 | A1 * | 1/2005 | Held | 270/21.1 |
| 2013/0160796 | A1 * | 6/2013 | Cooke et al. | 134/6 |

* cited by examiner

*Primary Examiner* — Thien M Le

(74) *Attorney, Agent, or Firm* — Joseph P. Mehrle

(57) ABSTRACT

An apparatus and method are disclosed for removing at least one item of media from a rotating drum element. The apparatus includes a scraper element comprising a blade edge region locatable at an effective outer surface of a rotating drum element and a scraper element support that locates the blade edge region at a desired position at the effective outer surface responsive to a diameter of the effective outer surface. The scraper element rotates and moves laterally with respect to the support responsive to the diameter.

8 Claims, 4 Drawing Sheets

ITEM REMOVAL

FIELD OF THE INVENTION

The present invention relates to a method and apparatus for removing at least one item of media wrapped around a rotating drum. In particular, but not exclusively, the present invention relates to the removal of currency notes from a rotating support structure using a scraper which is continually and automatically located at an optimum location for scraping items of media off the support.

BACKGROUND TO THE INVENTION

As the bank branch becomes a primary delivery channel for financial institutions, there is a constant need to improve operational efficiency and provide users with an improved quality of service. Most financial institutions have in the past had a defined system in place determining how currency notes were physically handled in a branch. Typically, there has been a secure vault where bulk currency notes are stored and these are distributed after multiple counts to tellers who can then perform necessary cash transactions with customers. Likewise, when cash has been received from customers, this has been counted many times and eventually returned as incoming cash to a vault. It has thus not been uncommon for currency notes to be counted by hand many times on a journey through a branch. Such cash handling procedures have decreased employee efficiencies and increased customer wait times. There has thus been a need to reduce exposed currency notes in a branch.

As technology has improved, attempts have been made to automate certain aspects of the currency note handling process. Such technology allows for remote note imaging or check imaging, signature capture and other such verification steps. The development of such technology has led to the introduction of media depositories used in automated teller machines (ATMs) and other such self-service terminals. Media depositories are used to receive media items from a customer. One common type of media depository is a sheet media depository for receiving items of media in sheet form. For example, such items of media can be currency notes, checks, tickets, gyros or the like. Some sheet depositories are capable of receiving a bunch of sheet items of media in a loading area and then picking individual sheets from a bunch so that each sheet can then be identified and validated individually prior to storage of a validated sheet within a depository or returned to a customer.

Another type of automated unit is the currency recycler. In such devices, customers may deposit items of media such as currency notes, checks, vouchers or the like, and these are processed separately one-by-one and stored in various storage modules within a terminal. For example, a storage unit can be an escrow storage unit in which, instead of being deposited directly into a storage module, once counted and verified, currency notes or checks input by a user are held temporarily until a teller negotiating with a user completes a transaction. If a customer decides to cancel a transaction or asks for the items to be recounted, the original deposited bank currency notes can be returned. This function allows any disputes to be resolved promptly. The temporarily stored items are held in a roll storage module (RSM) in the escrow module.

Cash recyclers and other such units also include one or more roll storage modules (RSMs). Such RSMs are provided for each of the possible currency notes or checks or other such vouchers which may be presented at a recycler unit. For example, an RSM dedicated to a £10 note will be provided as well as an RSM dedicated to a £20 note as well as an RSM dedicated to a £50 note or the like.

When a customer presents a bunch of items, these do not need to be manually counted by a teller, but are instead fed into an input slot on the recycler unit. Each presented item is counted and verified within a recycler and once it has been decided to make a permanent deposit of the presented items, the items are separated and stored in a respective RSM. For example, all £20 notes presented in a bunch are stored in the £20 RSM etc.

A cash recycler thus helps automate acceptance, authentication and validation of currency notes. Another advantage of such units is that the deposited items which are stored in respective RSMs can subsequently be dispensed when another user attends at a teller and requests currency notes. A cash recycler thus enables previously deposited currency notes to be instantly available for dispensing to customers.

Cash recyclers also help reduce transaction times and time taken for start and end-of-day cash balancing. Average wait times for customers can thus be reduced and overall branch security is improved.

In an RSM, items of media are wrapped around a cylindrical drum. The drum thus presents a curved outer surface and the items are bent around the outer surface and located and kept in place by one or more tape windings.

It is understood that there are other self-service terminals and other item storage devices where sheet items of media are stored on a semi-permanent basis for subsequent dispensation of the stored items to a user requesting them. On many occasions the rolled storage units utilized can store items for many hundreds, if not thousands, of hours. Often the storage occurs in such a way that the items are quite tightly wrapped, and thus curved. Being stored in such a state and for such a long period of time can make it extremely difficult on occasion to remove the items from a storage reel.

This problem is particularly pronounced when the storage drum used is used to store a large number of items. In such instances, the effective outer diameter of a storage drum and windings can be radically enlarged relative to the diameter of the drum in an empty state. Known techniques for scraping items of media from a rotating drum so as to assist the removal of the items are not able to cope with such large quantities as the expanding diameter interferes with the operation of the scraper. In particular, when storing many hundreds of notes, a drum diameter and thus a tangential angle of items leaving the effective outer surface of the drum becomes too great and the scraper is effectively pushed out of a desired location.

This has two detrimental effects. Firstly, a blade edge is no longer duly located to scrape items to release them from the drum. Also, items which are removed cannot access and move along a desired pathway to an exit orifice. The pathway is blocked by the expanded drum/windings.

SUMMARY OF THE INVENTION

It is an aim of the present invention to at least partly mitigate the above-mentioned problems.

It is an aim of certain embodiments of the present invention to provide an apparatus and method which can continually and automatically assist in the removal of items of media from a rolled storage drum.

It is an aim of certain embodiments of the present invention to provide a method and apparatus that provides a system of removing stored items from an RSM regardless of the number of stored of items. The system is thus able to store many hundreds or even thousands of items.

According to a first aspect of the present invention there is provided apparatus for removing at least one item of media from a rotating drum element, comprising:

a scraper element comprising a blade edge region locatable at an effective outer surface of a rotating drum element; and a scraper element support that locates the blade edge region at a desired position at the effective outer surface; wherein the scraper element rotates and moves laterally with respect to the support responsive to a diameter of the effective outer surface.

Aptly, the effective outer surface comprises an outer surface of the drum element or an outer surface of a tape element wrapped around the outer surface of the drum element.

Aptly, said a desired position comprises location of the blade edge region at a proximity and orientation with respect to the effective outer surface whereby a blade tip of said blade edge region almost engages the effective outer surface and an abutment surface of the blade region terminating in the blade tip has a desired angle of attack relative to a tangent of the effective outer surface.

Aptly, the blade edge region is continually located at a respective desired position automatically as items of media are added to or removed from the rotating drum element.

Aptly, the support comprises a first and further spaced apart substantially parallel plate element, each comprising a respective elongate plate aperture into which a respective end of a shaft element supporting the scraper element is rotatably mounted.

Aptly, the first and further plate elements rotate in common at a respective first end region thereof about a support axis of rotation and the support further comprises a riding roller element urged against said effective outer surface to ride thereon; wherein the support plate elements rotate responsive to a location of the riding roller element.

Aptly, at least one wall member comprises an elongate wall aperture, an end of said shaft element being rotatably mounted in the wall aperture and a respective one said plate aperture; wherein a longitudinal axis of the wall aperture and a longitudinal axis of the respective one plate aperture are angled apart to lock the shaft element at a position respective to a diameter of the outer surface.

Aptly, the scraper support comprises at least one elongate aperture that locates an end of a shaft carrying the scraper element wherein the shaft end locates along the aperture responsive to said a diameter to thereby provide lateral movement of the scraper element with respect to the support.

Aptly, the scraper support comprises at least one aperture that locates an end of a shaft carrying the scraper element wherein the shaft end rotates in the aperture responsive to said a diameter to thereby provide rotational movement of the scraper element with respect to the support.

Aptly, the scraper support comprises at least one elongate aperture associated with a longitudinal axis that locates an end of a shaft carrying the scraper element and an adjacent wall element comprises an elongate aperture associated with a respective longitudinal axis angled with respect to said a longitudinal axis that locates said an end, wherein the shaft locates at a crossover point of the apertures responsive to said a diameter.

According to a second aspect of the present invention, there is provided an automated teller machine (ATM) comprising an escrow container which comprises apparatus for removing at least one item of media from a rotating drum element, comprising:

a scraper element comprising a blade edge region locatable at an effective outer surface of a rotating drum element; and a scraper element support that locates the blade edge region at a desired position at the effective outer surface; wherein the scraper element rotates and moves laterally with respect to the support responsive to a diameter of the effective outer surface.

According to a third aspect of the present invention, there is provided a method for removing at least one item of media from a rotating drum element, comprising:

locating a scraper element support responsive to a diameter of an effective outer surface of a rotating drum element; and locating a blade edge region of a scraper element supported by the support at a desired position at the effective outer surface by rotating and moving the scraper element laterally with respect to the support responsive to said a diameter.

Aptly, the method includes continually locating the blade edge region at a respective desired position automatically.

Aptly, the method further includes the step of locking motion of a shaft element supporting the scraper element at a pre-determined position with respect to the support, said pre-determined position being variable responsive to the diameter of the effective outer surface.

Aptly, the method further comprises wrapping an item of media or removing a wrapped item of media at the effective outer surface of the rotating drum element thereby changing the diameter of the effective outer surface; as the diameter changes, unlocking the shaft element; locating the shaft element at a new pre-determined position responsive to a new effective diameter; and locking motion of the shaft element at the new pre-determined position.

Aptly, the method further comprises locating the scraper element support by urging a riding roller element on the support against the effective outer surface; and rotating plate elements of the support about a support axis of rotation as the roller element moves towards or away from a central axis of rotation of the drum element.

Aptly, the method further comprises wrapping at least 400 items of media one-by-one around the rotating drum element.

Aptly, the method further comprises unwrapping pre-stored items of media one-by-one from a rotating drum, removal of each item being facilitated by locating a scraper at a lift off location and at a desired angle of attack with respect to a next item to be removed that is wound on the rotating drum.

According to a fourth aspect of the present invention there is provided a self-service terminal or cash recycler or teller assist unit comprising apparatus for removing at least one item of media from a rotating drum element, comprising:

a scraper element comprising a blade edge region locatable at an effective outer surface of a rotating drum element; and a scraper element support that locates the blade edge region at a desired position at the effective outer surface; wherein the scraper element rotates and moves laterally with respect to the support responsive to a diameter of the effective outer surface.

According to a fifth aspect of the present invention, there is provided apparatus for removing at least one item of media from a rotating drum element, comprising a scraper element comprising a blade edge region locatable at an effective outer surface of a rotating drum element and a scraper element support that locates the blade edge region at a desired position at the effective outer surface responsive to a diameter of the effective outer surface.

According to a sixth aspect of the present invention, there is provided apparatus for removing at least one item of media from a rotating drum element, comprising a scraper element comprising a blade edge region locatable at an effective outer surface of a rotating drum element and a scraper element support that locates the blade edge region at a desired position at the effective outer surface responsive to a diameter of the effective outer surface wherein an abutment surface of the blade region is continually located substantially at a pre-determined angle of attack relative to a tangent of the effective outer surface independent of the diameter.

According to a seventh aspect of the present invention there is provided apparatus for removing at least one item of media from a rotating drum element, the apparatus comprising:

a scraper support defining a slot;

a scraper including (i) a blade edge region locatable at an effective outer surface of a rotating drum element, and (ii) a mounting shaft slidably located in the slot and operable to rotate and slide within the slot in response to changes in a diameter of the effective outer surface of the rotating drum element.

Certain aspects of the present invention provide the advantage that large numbers of items of media may be stored in an RSM and subsequently removed as required.

Certain aspects of the present invention provide the advantage that a scraper element used to assist during the removal of previously wrapped items of media is automatically and continually located at an optimum position with respect to a rotating drum. The scraper element may be located at a desired lift off position and at an angle of attack with respect to a tangent to the effective outer surface of a rotating drum so that items of media are lifted from the drum at an outer peripheral edge thereof.

Certain embodiments of the present invention provide a very compact storage module which is able to fit many items of media in a stored state for a given volume of space. Certain embodiments of the present invention continually and automatically locate a scraper used to remove items of media in such a way that the scraper does not become unduly sharp which would otherwise cut or tear items of media or tape used to store items of media in a RSM.

Certain embodiments of the present invention provide an RSM able to store more than 1000 items of media.

BRIEF DESCRIPTION OF DRAWINGS

Embodiments of the present invention will now be described hereinafter, by way of example only, with reference to the accompanying drawings in which.

DESCRIPTION OF EMBODIMENTS

Figure 1:
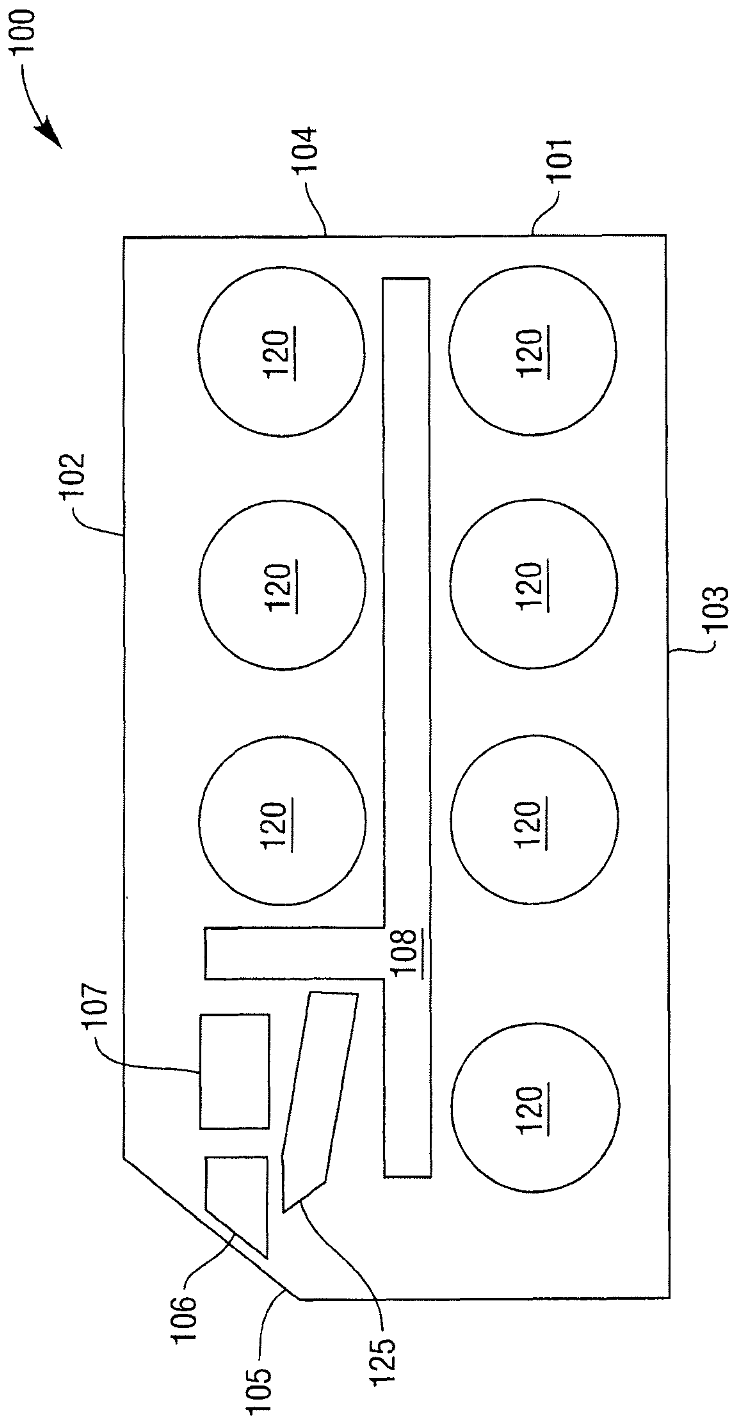
FIG. 1 is a schematic diagram of a teller assist unit according to an embodiment of the present invention.

In the drawings like reference numerals refer to like parts.

FIG. 1 illustrates a teller assist unit 100 according to an embodiment of the present invention. It will be understood that certain embodiments of the present invention are not restricted to storage units within a teller assist unit but optionally may be used in automated teller machines (ATMs), cash recyclers, vending machines or the like wherever sheet items of media such as currency notes, checks, vouchers, pages or the like are to be stored and/or deposited. The teller assist unit 100 includes a secure housing 101 which includes a top wall 102 and floor standing wall 103, together with a back wall 104 and a front fascia wall 105. The front fascia includes a bill, entry/exit slot 106 at which a user can present a bunch of currency notes or checks or single currency notes or checks or other such items of media for deposit. The bill entry/exit slot 106 is also the outlet slot whereby items of media such as currency notes and/or checks are returned or are dispensed to a user dependent upon a user requirement. In the instance of a teller assist unit, the user is a teller of a bank branch or other such authorized user who acts as an interface with a bank customer. Currency notes or checks deposited are validated by a bill validator 107, as will be understood by those skilled in the art. A bill transport path 108 which includes one or more rollers and/or endless belts is used to locate items of media one-by-one at a desired roll storage module 120.

In addition to handling deposits the teller assist unit can be utilized to dispense currency notes which are stored in the roll storage modules. For example, if a teller requires £120 worth of currency notes, this information may be input at a user interface (not shown) on the front fascia 105 of the teller assist unit and then a central processing unit (not shown) initiates selection of currency notes from one or more roll storage modules. For example, to dispense £120, the roll storage module (RSM) which holds £20 notes may be placed in a dispense mode of operation in which six previously stored £20 notes are dispensed from the RSM onto the bill transport path 108. A bill return path module 125 is utilized to locate dispensing items from the bill transport path 108 to the exit slot 106. It will be understood that rather than dispensing six £20 notes from a single RSM, the teller assist unit may be selectively operated to dispense two £50 notes form a £50 note RSM and two £10 notes from a £10 note RSM. Other combinations are of course possible.

Figure 2:
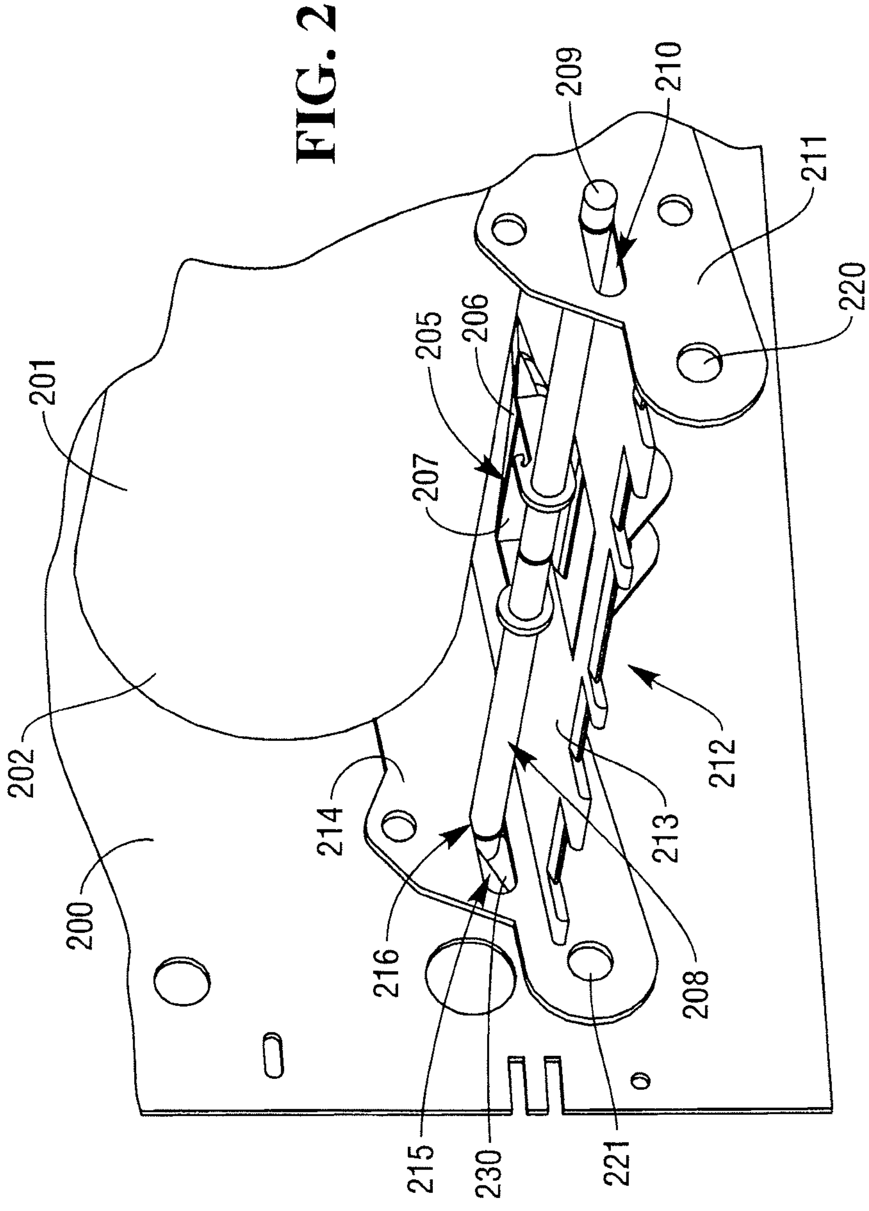
FIG. 2 is a schematic diagram showing a scraper element and a scraper element support located with respect to a rotating storage drum.

FIG. 2 illustrates parts of an RSM 120. Each RSM includes a secure box formed form a back plate 200 which is spaced apart from, and substantially parallel with, a front wall 201 (not shown). The front and back walls are closed by opposed end walls and top and bottom walls (also not shown).

The RSM also includes a rotatable drum 201. This has a substantially cylindrical outer surface 202 and is arranged to rotate about a longitudinal rotation axis. The drum is driven by a drive motor and drive system (not shown).

In use, a pair of tapes, which may be separate tapes or portions of a single continuous tape, are secured to an outer surface 202 of the drum and are continually wrapped around the outer surface of the drum. Thus, with the tapes unwound an effective outer surface of the drum is provided by the cylindrical outer surface. As the tapes are wound around the outer surface of the drum an outermost winding of the tapes provides an effective outer surface of the drum. A diameter of the effective outer surface of the rotating drum will thus vary depending upon the number of windings of tape.

Items of media such as currency notes or the like are wrapped around the curved cylindrical surface of the drum by being sandwiched between the two tapes as the tapes are wound onto the drum. Thus, over time, as items of media are stored on the drum, the outer diameter increases with currency notes being wound one after another at pre-determined locations and a pre-determined circumferential distance apart on the drum. The notes are sandwiched between tape.

In order to assist the removal of items of media which have been stored on the rotatable drum, a scraper 205 is provided. This scraper 205 includes a blade edge 206 and a scraper body 207 that is secured to a shaft 208. The shaft 208 has a first end 209 which is located in an elongate aperture 210 in a side wall 211 of a skid plate 212. The skid plate provides a substantially shovel-like platform including a base plate 213 and a further side wall 214. The further side wall 214 also includes an elongate aperture 215 which has a similar size, dimension and shape as the aperture 210 in the first side wall 211 which is spaced apart from and substantially parallel with the further side wall 214. A further end 216 of the shaft 208 which supports the scraper is located in the further aperture 215 in the further side wall 214. The skid plate 212 including the base plate 213 and the opposed side walls 211, 214 rotate as a single piece about a pivot point indicated by the position of a hole 220 in the first side wall 211 and a further hole 221 in the further side wall 214. Whilst an end of the skid plate 212 thus pivots up and down, a remaining end is free. This free end of the skid plate is urged by a spring or other such biasing element (not shown) towards the outer surface of the drum. The free end also includes a roller which rides on the effective outer surface of the drum. That is to say, when the drum is empty the roller rotates and rides on the cylindrical outer surface of the drum, whilst when one or more windings or tape are wound around the drum the roller rolls on an outer surface of an outermost winding of an outermost tape. Thus, as an outer diameter of an effective outer surface of the drum increases or decreases, the roller which is caused to be constantly and automatically urged against the effective outer surface by the spring, causes the skid plate 212 to pivot constantly so as to be located at a desired position with respect to the drum which is dependent upon the diameter of the effective outer surface.

The back plate panel 200 also includes an elongate aperture (partly shown) 230. This aperture has a similar shape, that is to say an elongate rectangle with rounded ends, as the elongate apertures 210, 215 in the side walls of the skid plate. However, a longitudinal axis of the aperture 230 in the back plate panel 200 is angled with respect to an elongate longitudinal axis associated with the apertures in the skid plate side walls. It will be understood that an opposing front plate panel of the RSM may optionally also have an appropriately angled elongate aperture. The elongate apertures in the front and back plate panels are a similar size and are angled at an identical angle with respect to a longitudinal axis of the apertures in the side walls of the skid plate.

Figure 3:
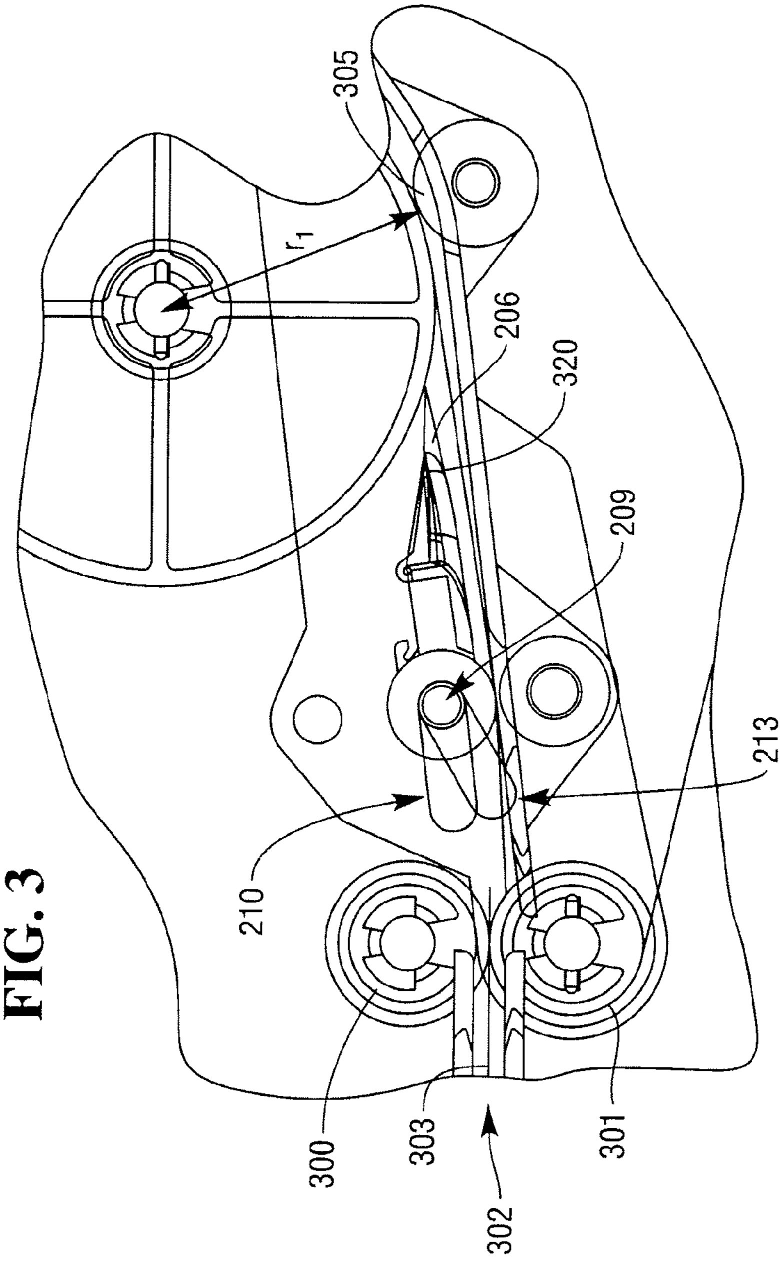
FIG. 3 illustrates location of a scraper element with respect to a near empty rotating storage drum.

FIG. 3 illustrates the location of a blade edge of the scraper and the skid plate for an empty or nearly empty drum. As illustrated in FIG. 3, opposed rollers include an upper roller 300 and a lower roller 301. One or both of these rollers is a driven roller so that items of media may be introduced through an entrance/exit orifice 302 in a deposit mode of operation. An incoming item of media 303 is shown in FIG. 3. It will be understood that in a withdrawal mode of operation the rollers will rotate in an opposite direction and items of media will be removed from the drum along a similar path and out of the orifice 302 which thus acts as a port. (In this sense the item 303 shown in FIG. 3 could also show a location of an outwardly moving item).

As will be understood with respect to FIGS. 2 and 3, the skid plate 212 is aligned to pivot about the same axis as the lower roller 301. The base plate 213 of the skid plate is illustrated in FIG. 3 in a position which is inclined slightly upwards towards the free end of the skid plate above the horizontal. This is because a diameter of the effective outer surface of the drum is small (shown by radius $r_1$) and the roller 305 which is constantly urged against this surface, thus permits the skid plate to tilt upwards. With a relatively small diameter of an effective outer surface the shaft 208 is located so that an end 209 of the shaft is located towards an extreme end of both the elongate aperture 210 in the skid plate side wall and the elongate aperture in the back and/or front plate. The location of the shaft locates the scraper body 207 and the blade edge 206 located at an end thereof. The blade edge 206 is held in a position on or immediately proximate to the effective outer surface of the drum. That is to say, when the drum is empty the blade edge rides on the cylindrical outer surface of the drum or very proximate to it, and when a few windings or more are on the drum the blade edge rides on an outer surface of an outermost winding or very proximate to it.

An abutment surface 320 of the scraper extends from the blade edge 206 along a lower surface of the blade body. This abutment surface helps guide incoming items of media in a deposit mode of operation moving in a left to right motion in FIG. 3. It is to be noted that in a withdrawal mode of operation, the abutment surface 320 also guides items of media as they are released from windings on the drum so as to direct the items of media to the port 302.

Figure 4:
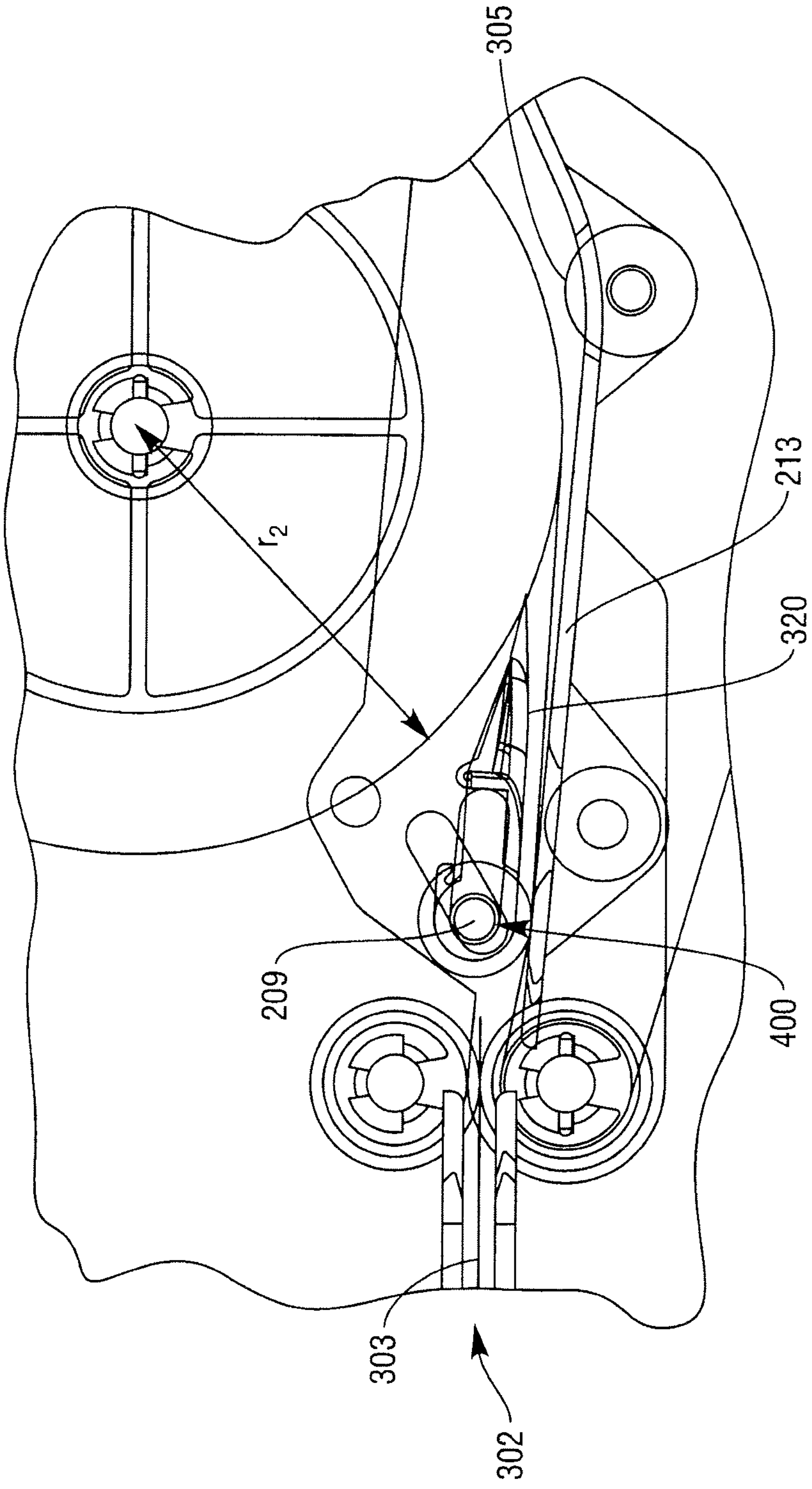
FIG. 4 illustrates location of a scraper element and support with respect to a nearly full rotating storage drum.

FIG. 4 illustrates the position of the skid plate and drum when the drum is full or almost full. In this sense it is to be noted that a radius $r_2$ of the effective outer surface of the drum shown in FIG. 4 is substantially greater than the radius $r_1$ shown in FIG. 3. In this sense the roller 305 which is fixed to the skid plate and is rotatable therewith and which rides on an effective outer surface of the drum locates the base plate 213 of the skid plate 212 in a slightly declined position with respect to the horizontal. As shown in FIG. 4 an item of media 303 which is incoming or outgoing at the port 302 follows a pathway towards the drum below an abutment surface 320 of the blade. This pathway remains open regardless of the diameter of the effective outer surface. This enables items of media such as currency notes or the like to be delivered at the port 302, driven by opposed rollers 300, 301 and driven along the pathway to a position where opposed tape windings will be wound onto an outermost surface of the drum. When the drum is empty the tape windings of a first winding will be wound onto the cylindrical outer surface of the drum. For subsequent windings the two tape elements which sandwich a currency note therebetween will be wound on top of an outermost surface of an outermost immediately preceding winding of tape.

As illustrated in FIG. 4, as the base plate 213 of the skid plate is pivoted upwards or downwards dependent upon whether the diameter of the drum is increasing or decreasing, the position of the shaft, illustrated by the location of the end 209 of the shaft 208 in FIG. 4, is also constantly and automatically changed. As shown in FIG. 4, with the effective outer surface of the drum at or near to a maximum, the shaft end 209 is located at a lower end 400 of the angled elongate aperture in the side frame. Likewise, the shaft end 209 is located at a left hand side most (as shown in FIG. 4) end of an elongate slot 210 in the side wall 211 of the skid plate. It will be appreciated that the further end 215 of the shaft will be similarly located in elongate apertures in the first side wall 214 of the skid plate and the elongate aperture 215 in the back plate panel 200. Despite the fact that an effective outer surface of the drum has changed with respect to FIG. 4, it is noted that the blade edge 206 remains at a desired location with respect to the effective outer surface. That is to say, the blade edge remains riding on or very proximate to the effective outer surface. Also, the abutment surface 320 which guides items coming in or leaving the drum region is maintained at a desired location.

More particularly, the blade edge is located so as to scrape or otherwise remove items of media and tape of windings in a withdrawal mode of operation. Also, the abutment surface is angled with a desired angle of attack, relative to an effective tangential direction of the effective outer surface. That is to say, items of media being unwound (by rotating the drum clockwise as shown in FIG. 4) together with tape being unwound from the outermost surface of the drum and which leave the drum following a trajectory of a tangent to the effective outer surface. This means they meet with a duly aligned blade edge and abutment surface so as to help facilitate easy onward motion of the off coming items.

Embodiments of the present invention may provide a single tape escrow or other such roll storage region which utilizes a scraper to help remove notes, particularly tightly curled notes, from a drum and thereafter onto a transport system. The scraper is maintained in contact with an effective outer surface of the drum and is very close to or perfectly aligned with the tangential direction of the tape/notes being removed from a rotating drum. This ensures that all types of note conditions are removed from the drum.

Aptly, 500 or more items of media such as currency notes or the like may be stored in the storage module. Aptly, 1000 items of media such as currency notes or the like or more are stored in the storage module.

Certain embodiments of the present invention provide a scraper which is moved further back as an effective drum diameter increases whilst still ensuring that the scraper tip is very close to a lift off position where a next item of media is being removed from a roll. This is achieved by having a scraper shaft, which supports a scraper blade, pass through a parallel hole in a skid plate and continuing through a corresponding angled slot in an adjacent frame of a storage module. The skid plate is pulled by an urging mechanism such as one or more springs against the drum with a skid plate roller always in contact with the drum. As a result, as an effective drum diameter increases or decreases, the skid plate supporting a scraper moves accordingly. As the skid plate rotates with increasing drum diameter, the scraper shaft is forced along the profile of the two slots until it becomes locked. The two slots are angled with respect to each other so that the open space for the scraper shaft reduces, thus causing the scraper shaft to be locked for any one particular given diameter. The action of the two slots causes the scraper to be automatically and continually moved backwards and forwards for any given drum diameter.

Throughout the description and claims of this specification, the words “comprise” and “contain” and variations of them mean “including but not limited to” and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader’s attention is directed to all papers and documents which are filed concurrently with or previous to this specification in connection with this application and which are open to public inspection with this specification, and the contents of all such papers and documents are incorporated herein by reference.

What is claimed is:

1. Apparatus for removing at least one item of media from a rotating drum element, comprising:

a scraper element comprising a blade edge region locatable at an effective outer surface of a rotating drum element; and a scraper element support that locates the blade edge region at a desired position at the effective outer surface; wherein the scraper element rotates and moves laterally with respect to the support responsive to a diameter of the effective outer surface, and wherein the support comprises a first and further spaced apart substantially parallel plate element, each comprising a respective elongate plate aperture into which a respective end of a shaft element supporting the scraper element is rotatably mounted.

2. The apparatus as claimed in claim 1, further comprising:

the effective outer surface comprises an outer surface of the drum element or an outer surface of a tape element wrapped around the outer surface of the drum element.

3. The apparatus as claimed in claim 1, further comprising:

said a desired position comprises location of the blade edge region at a proximity and orientation with respect to the effective outer surface whereby a blade tip of said blade edge region almost engages the effective outer surface and an abutment surface of the blade region terminating in the blade tip has a desired angle of attack relative to a tangent of the effective outer surface.

4. The apparatus as claimed in claim 1, further comprising:

the blade edge region is continually located at a respective desired position automatically as items of media are added to or removed from the rotating drum element.

5. The apparatus as claimed in claim 1, further comprising:

the first and further plate elements rotate in common at a respective first end region thereof about a support axis of rotation; and the support further comprises a riding roller element urged against said effective outer surface to ride thereon; wherein the support plate elements rotate responsive to a location of the riding roller element.

6. The apparatus as claimed in claim 1, further comprising:

at least one wall member comprising an elongate wall aperture, an end of said shaft element being rotatably mounted in the wall aperture and a respective one said plate aperture; wherein a longitudinal axis of the wall aperture and a longitudinal axis of the respective one plate aperture are angled apart to lock the shaft element at a position respective to a diameter of the outer surface.

7. An automated teller machine (ATM) comprising an escrow container, said escrow container comprising the apparatus as claimed in claim 1, and each item of media comprising a currency note.

8. A self-service terminal or teller assist unit or case recycler comprising the apparatus as claimed in claim 1 wherein each item of media comprises a currency note.

* * * * *